(12) United States Patent
    Valecha et al.

(10) Patent No.: US 11,454,047 B2
(45) Date of Patent: Sep. 27, 2022

(54) CONSTRUCTING PHYSICAL KEYS BY WAY OF DIGITAL KEYS

(71) Applicant: International Business Machines Corporation, Armonk, NY (US)

(72) Inventors: Vinod A. Valecha, Pune (IN); Rinkesh I. Bansal, Pune (IN); Sanjay B. Panchal, Mumbai (IN); Chintan Thaker, Pune (IN)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 16/446,684

(22) Filed: Jun. 20, 2019

(65) Prior Publication Data
    US 2020/0399928 A1    Dec. 24, 2020

(51) Int. Cl.
    | | |
    |---|---|
    | *B29C 64/393* | (2017.01) |
    | *E05B 17/22* | (2006.01) |
    | *H04L 9/08* | (2006.01) |
    | *E05B 19/20* | (2006.01) |
    | *B33Y 50/02* | (2015.01) |

(52) U.S. Cl.
    CPC ............ *E05B 17/22* (2013.01); *B29C 64/393* (2017.08); *E05B 19/205* (2013.01); *H04L 9/0866* (2013.01); *B33Y 50/02* (2014.12)

(58) Field of Classification Search
    CPC ... B23C 2235/12; B23C 2235/28; B23C 3/35; B23P 15/005; B23Q 35/00; G05B 15/02; G06Q 20/18; G07F 11/70; G07F 17/26; Y10T 409/300952; Y10T 409/301624; G06F 21/31; G06F 21/35; G06F 21/6218; H04L 63/0492; H04L 63/06; H04L 9/0894; H04L 9/321
    See application file for complete search history.

(56) References Cited

U.S. PATENT DOCUMENTS

| | | |
    |---|---|---|
    | 6,318,137 B1 | 11/2001 | Chaum |
    | 9,946,858 B2 | 4/2018 | Wallrabenstein |
    | 2003/0205070 A1* | 11/2003 | Chaum .................. G05B 19/00 70/278.3 |
    | 2012/0237024 A1 | 9/2012 | Liu |
    | 2013/0173044 A1* | 7/2013 | Marsh .................... G06Q 20/18 700/186 |
    | 2014/0314508 A1 | 10/2014 | Seriff |
    | 2017/0152677 A1* | 6/2017 | Klammer ................ E05B 11/00 |
    | 2019/0081792 A1 | 3/2019 | Thom |

OTHER PUBLICATIONS

Harrison et al., "Protection of Information Using a Software Lock And Key", IP.com Prior Art Database Technical Disclosure, Feb. 1, 1989, IP.com No. IPCOM000037454D, 2 pages.

* cited by examiner

*Primary Examiner* — Alexander M Weddle
    (74) *Attorney, Agent, or Firm* — Stephen R. Yoder

(57) ABSTRACT

A digital key management system for physical keys is provided. A processor registers a physical lock. A processor generates a digital key based on a physical key structure to be used with the physical lock. A processor configures the physical lock to decode an inserted physical key. A processor verifies the inserted physical key, in response to a digital key for the decoded physical key matching the generated digital key.

3 Claims, 6 Drawing Sheets

CONSTRUCTING PHYSICAL KEYS BY WAY OF DIGITAL KEYS

BACKGROUND OF THE INVENTION

The present invention relates generally to the field of security, and more particularly to authorization management.

Locks are physical devices that fasten to an object to limit access to an area or goods. Typically, a physical key is provided with purchase of a lock to engage or disengage the lock to permit access to the area or goods. Digital keys are data that is encoded or otherwise represents information for a variety of functions, such as digital signatures for verification of or access to information that is encoded by a certain digital key.

SUMMARY

A method, computer program product, and computer system for a digital key management system for physical keys is provided. A processor registers a physical lock. A processor generates a digital key based on a physical key structure to be used with the physical lock. A processor configures the physical lock to decode an inserted physical key. A processor verifies the inserted physical key, in response to a digital key for the decoded physical key matching the generated digital key.

DETAILED DESCRIPTION

Figure 1:
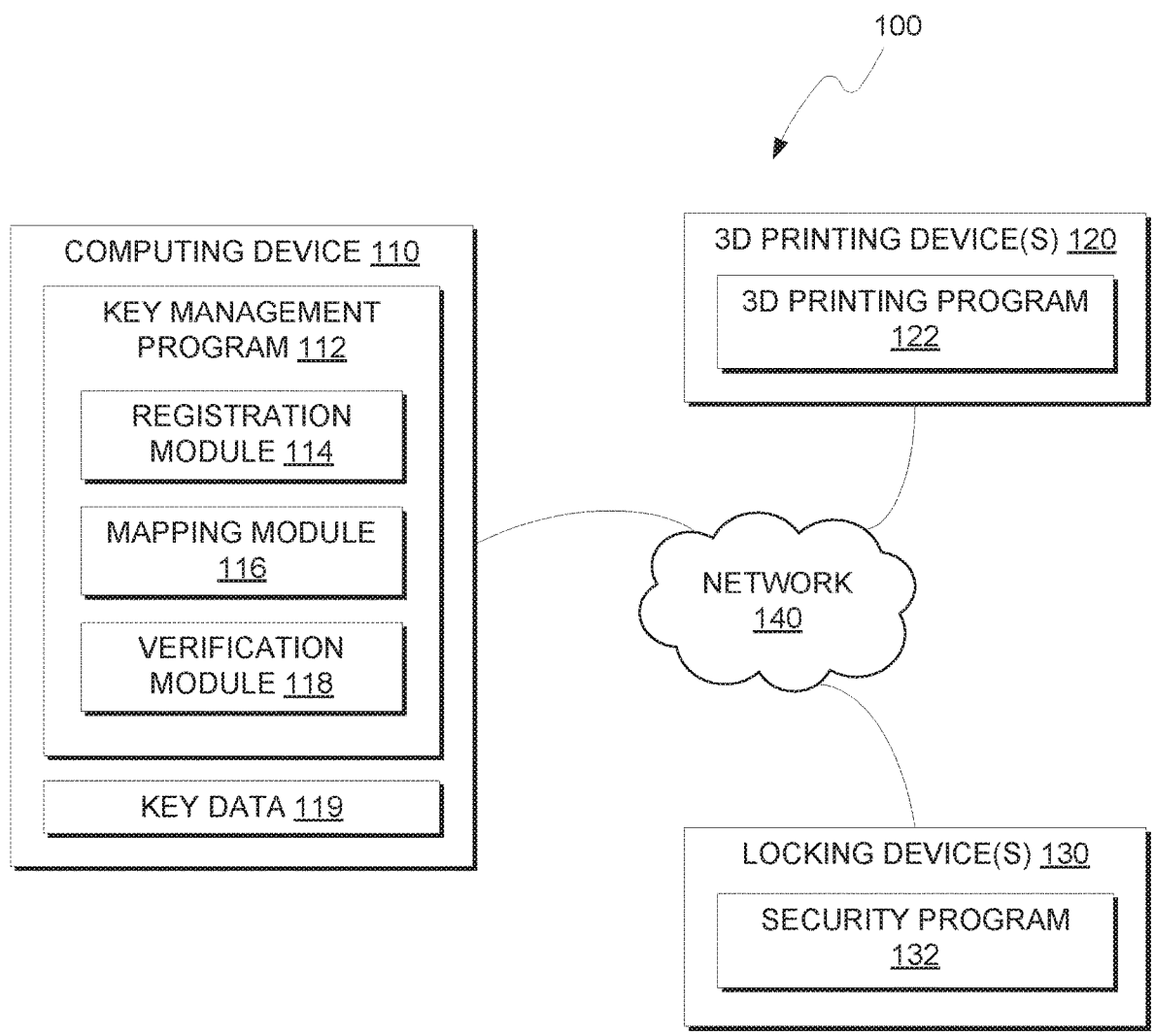
FIG. 1 is a functional block diagram illustrating a networked environment, in accordance with an exemplary embodiment of the present invention.

While solutions to physical security are old and well known, they are still tied to the physical limitations of the apparatuses. For example, physical lock and key security devices are still susceptible to being comprised by way of the key being stolen or given to an unauthorized party. Other solutions to address this issue introduce additional requirements that may be burdensome to some users, such as multi-factor authentication via biometrics or another device such as a registered phone. Furthermore, in many scenarios the convenience of sharing a physical key has benefits which still see use in many of today's security devices.

Embodiments of the present invention recognize that by incorporating digital key management techniques, as both a delivery mechanism of and verification for physical keys, improvements are provided to physical security with the additional benefits of digital key management, all with minimum impact to the convenience of traditional lock and key. Embodiments of the present invention provide mechanisms and processes that permit a physical key to be shared by users while also providing digital key management operations that verify the physical key upon each use, as well as unauthorizing old physical keys and issuing new physical keys.

Embodiments of the present invention also provide improvements to physical security where delivery or sharing of the key between users may be difficult. For example, embodiments of the present invention provide improvements to physical security of delivery via drones, as the delivery payload may be under lock and key and sharing the key may be difficult due to the distance between the shipper and receiver of the drone delivery. Embodiments of the present invention also provide improvements to physical security where electronics and other forms of multifactor authentication may not be permitted. Many high security environments do not permit the use, or even the presence, of electronic devices, such as a smartphone that could be used in multifactor authentication. In these scenarios, embodiments of the present invention provide improvements to security by providing digital key management practices to a physical key.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110, 3D printing device(s) 120, and locking device(s) 130 connected over network 140. Computing device 110 includes key management program 112 and key data 119. Key management program 112 includes registration module 114, mapping module 116 and verification module 118. 3D printing device(s) 120 each include a respective 3D printing program 122. Locking device(s) 130 each include a respective security program 132.

In various embodiments of the present invention, computing device 110, 3D printing device(s) 120, and locking device(s) 130 are each a computing device that can be a standalone device, a server, a laptop computer, a tablet computer, a netbook computer, a personal computer (PC), or a desktop computer. In another embodiment, computing device 110, 3D printing device(s) 120, and locking device(s) 130 each, or collectively, represent a computing system utilizing clustered computers and components to act as a single pool of seamless resources. In general, computing device 110, 3D printing device(s) 120, or locking device(s) 130 can be any computing device or a combination of devices with access to key data 119 and is capable of executing key management program 112, 3D printing program 122 and security program 132. Each of computing device 110, 3D printing device(s) 120, or locking device(s) 130 may include internal and external hardware components, as depicted and described in further detail with respect to FIG. 6.

In this exemplary embodiment, key data 119 and key management program 112 are stored on computing device 110; 3D printing program 122 is stored on respective 3D printing device(s) 120; and security program 132 is stored on respective locking device(s) 130. However, in other embodiments, key data 119, key management program 112, 3D printing program 122, and security program 132 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between computing device 110, 3D printing device(s) 120, and locking device(s) 130, in accordance with a desired embodiment of the present invention.

In various embodiments, key management program 112 maintains and generates key data 119 associated with locking device(s) 130. Locking device(s) 130 are registered with key management program 112 upon initial use and can be registered or reconfigured again. Upon registration, the registered locking device of locking device(s) 130 is configured to accept a physical key of a certain shape to disengage a locking mechanism of the respective locking device(s) 130.

In various embodiments, locking device(s) 130 include one or more sensors to determine the physical characteristics of a physical key inserted into a locking mechanism for respective locking device(s) 130. Often referred to as bitting or the bits of the key, the bitting of the key represents the shape or physical arrangement of the key (e.g., the bitting refers to the cut and shape of the physical key). One of ordinary skill in the art will appreciate that locking device(s) 130 determines the physical characteristics of an inserted key based on a variety of sensors such as, but not limited to, digital cameras or other sources imaging data, one or more infra-red sensors, capacitive proximity sensors, inductive sensors or any other sensor technology that may already be or become known in the art.

In various embodiments, locking device(s) 130 are communicatively coupled to computing device 110, such as by network 140. Upon registration of a locking device from locking device(s) 130, key management program 112 of computing device 110 generates key data 119. Key data 119 includes a digital key for each of the registered locking device(s) 130. The digital keys of key data 119 are encoded to include various physical characteristics (e.g., the bitting) of a physical key, as discussed herein. In some embodiments and scenarios, the digital keys of key data 119 also are encoded using one or more encryption techniques such as, but not limited to, symmetric encryption (e.g., cyphers or paired key) or asymmetric/public-key encryption (e.g., Pretty Good Privacy (PGP), Rivest-Shamir-Adleman (RSA), and the like). One of ordinary skill in the art will appreciate that by encrypting encoded physical key data, the digital key may be shared or sent to users without compromising the physical characteristics of the physical key during transmission, providing a secure mechanism for sharing and sending physical keys by both key management program 112 and among users of the present invention.

In various embodiments, key management program 112 generates a mapping used to represent a physical key shape, size and other characteristics. For example, key management program 112 generates a mapping using alphanumeric code to represent the physical characteristics of the physical key. In this example, each alphanumeric value in the mapping represents depth for each bit of the physical key (e.g., A=0.01 mm, B=0.02 mm, etc.) with the length of the mapping representing each bit of the key (e.g., a mapping of "A3GH % I" would have six bits for the physical key. In some scenarios, key management program 112 generates a mapping with more than one character or value representing a single bit of the physical key (e.g., "AT-G&-U3", where the dash "-" denotes that two characters are combined for each bit value) in scenarios where higher tolerances or greater precision are desired. One of ordinary skill in the art will appreciate that any mapping or representation of physical key structure and shape may be used without deviating from the invention.

In various embodiments, key management program 112 sends the mapped physical key value to a user for creation of a physical key as a digital key, as discussed herein. In some embodiments, key management program 112 encrypts, encodes or otherwise transform the mapping for the physical key using one or more encryption or encoding methods. For example, key management program 112 encrypts the physical key's mapping with an asymmetric public/private key pairing for secure sharing among users as well as verification of the sender.

In various embodiments, key management program 112 registers a locking device of locking device(s). In some embodiments and scenarios, key management program 112 sends the mapping to locking device being registered. In response, the locking device being registered is configured to accept keys that match the mapping provided during registration. In other embodiments and scenarios, key management program 112 sends a digital key to the locking device being registered. In response, the locking device being registered is configured to accept keys that match the digital key sent. In such scenarios, the registered locking device converts an inserted key to a mapping, then encodes or encrypts the mappings in a similar manner as key management program 112. If the digital key derived from the inserted key matches the digital key sent during registration, the registered locking device will disengage or unlock. In further embodiments and scenarios, the locking device is not provided a mapping or digital key during registration. Key management program 112 generates a mapping of an authorized physical key, however only stores the mapping or digital key locally in key data 119. A registered locking device sends a mapping or digital key of an inserted physical key to key management program 112. In such scenarios, key management program 112 verifies the mapping or digital key provided by the locking device matches the mapping or digital key in key data 119. In scenarios where the provided mapping or key matches the stored key data 119, key management program 112 sends commands or instructions to the registered locking device to disengage or unlock.

In various embodiments, key management program 112 generates a digital key for a registered lock of locking device(s) 130, storing the digital key in key data 119. In some scenarios, key data 119 includes a mapping value for the bitting of a physical key. In other scenarios, key data 119 includes encrypted mapping values for the bitting of a physical key. In some scenarios, a user requests a digital key for access to a registered lock of locking device(s) 130. In response, key management program 112 sends the digital key from key data 119 associated with the registered lock. In such scenarios, key management program 112 includes an account management system for authorizing users to ensure secure sharing and dissemination of key data 119. In some scenarios, key management program 112 provides the digital key to a user upon registering a lock. In such scenarios, the user may provide other users with the digital key. One of ordinary skill in the art will appreciate that any system or method for sending and sharing digital keys may be used without deviating from the invention.

In various embodiments, once a user is supplied a digital key for a registered lock of locking device(s) 130, the user interacts with a 3D printing device 120 to generate a physical key for opening the registered lock. 3D printing program 122 of the 3D printing device provides an interface for the user to supply the digital key. In some scenarios, the user inputs the key by an input device, such as a keyboard. In other scenarios, the user supplies a storage device to the 3D printing device which includes the digital key. In some scenarios, the user provides an address or other indicative information to a location or device connected to network 140 where the digital key is stored. One of ordinary skill in the art will appreciate that any method and medium for providing or transferring the digital key to the 3D printing device 120 may be used without deviating from the invention.

In various embodiments, 3D printing program 122 retrieves the provided digital key as instructed by the user. 3D printing program 122 converts the digital key to a model for 3D printing device to create. In various embodiments, 3D printing device 120 includes, or is communicatively coupled to, a 3D printer. A 3D printer is any device that can create or generate an object of a certain shape. Typically, 3D printing is referred to an additive process, where a computer-controlled extruder deposits material in various layers to create an object of a certain size, shape and dimension, such as the physical key. In other scenarios, 3D printing device 120 is includes, or is communicatively coupled to, another manufacturing device, such as a subtractive manufacturing device like a computer numeric controlled (CNC) device. A subtractive manufacturing device is provided a solid block of material and the subtractive device removes the material from the block until the resulting object is of the desired shape. One of ordinary skill in the art will appreciate that 3D printing devices 120 may include any device that can create an object, such as a physical key, with a known shape and size.

In various 3D printing program 122 generates a model for 3D printing device 120 to generate based on the digital key. In various embodiments, the digital key includes, or can be decoded to provide, a mapping of physical key's bitting or other physical characteristics, as discussed herein. Based on the bitting of the key indicated by the mapping, 3D printing device 120 generates a model to provide to the connected 3D printer for printing, such as a computer aided draft (CAD) model. Upon receiving the model, the 3D printer prints or otherwise creates a physical key. Upon completion of the printing, the user retrieves the key for later use on the register lock of locking device 130.

In various embodiments, after retrieval of the physical key, the user inserts the key into the registered lock of locking devices 130. Locking devices 130 include one or more sensors to detect and identify the shape of the inserted physical key. Based on the configuration of the registered lock, security program 132 verifies that the inserted key's shape is registered. As discussed herein and in some scenarios, a locking device 130 is configured to locally verify the shape of an inserted key based on either a provided mapping or a digital key, which are sent by key management program 112 during registration of the lock. In other scenarios, a locking device 130 is configured to remotely verify the inserted key by sending a digital key or mapping of the physical key to key management program 112, which in turn key management program 112 verifies the inserted key based on registered locks stored in key data 119 and the supplied mapping or digital key provided by the lock. Based on the verification of the inserted physical key, security program 132 either disengages the lock for verified physical keys or remains engaged if unverified physical keys are inserted.

Figure 2:
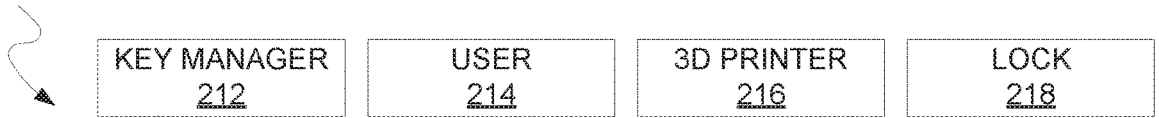
FIG. 2 illustrates a flow diagram of various operational processes to provide physical keys via digital keys, in accordance with an exemplary embodiment of the present invention.
Figure 2:
Figure 2:
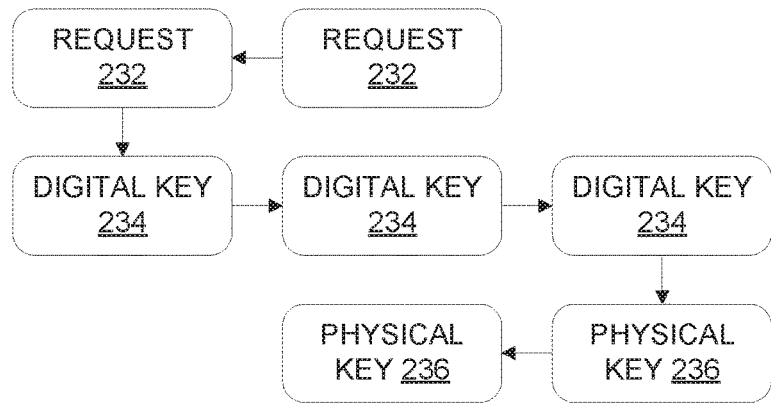
Figure 2:
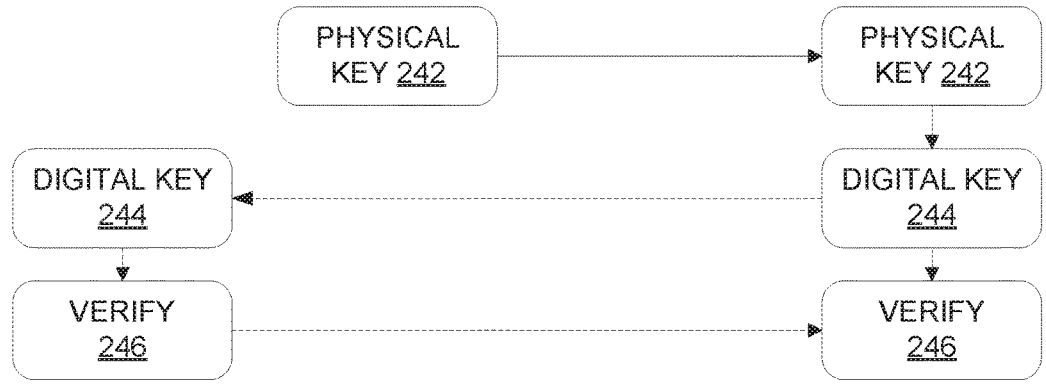

FIG. 2 depicts a flow diagram, generally designated as 200, of various operational processes to provide physical keys via digital keys to users. FIG. 2 depicts three processes, Lock and Key Configuration 220, Key Printing 230, and Key Verification 240. For each of the processes, four participants are depicted, Key Manager 212, User 214, 3D Printer 216 and Lock 218. While the following will be discussed in relation to a single lock, one of ordinary skill in the art will appreciate that following also may be repeated and performed a more than one locking device of locking devices 130.

In Lock and Key Configuration 220, user 214 registers lock 218 with key manager 212. Key manager 212 generates a configuration 222 for lock 218. In some scenarios, such as when lock 218 has a consistent connection to network 140, configuration 222 instructs lock 218 to request verification from key manager 212. In other scenarios, such as when lock 218 has an intermittent connection to network 140 or may be later disconnected from network 140, configuration 222 provides key data 119 associated with lock 218. In both scenarios, key manager 212 generates a physical key mapping that is encoded, and in some embodiments encrypted, as a digital key to encode a physical key's bitting that will permit unlocking of lock 218, as discussed herein. Key manager 212 stores the mapping or digital key in key data 119.

In Key Printing 230, user 214 sends request 232 to key manager 212 for digital key 234 to unlock lock 218. In some scenarios, user 214 is provided digital key 234 during Lock and Key Configuration 220. In other scenarios and in response to receiving request 232, key manager 212 retrieves digital key 234 from key data 119 for lock 218. Once user 214 is supplied digital key 234, user 214 provides 3D printer 216 with digital key 234. 3D printer decodes or otherwise converts digital key 234 to a model to create physical key 236. 3D printer sends the model to an additive or subtractive manufacturing device to create physical key 236. User 214 retrieves physical key 236 for later use with lock 218.

In Key Verification 240, the user inserts physical key 242 into lock 218. Lock 218 scans the inserted physical key 242 to determine the shape and physical characteristics of the inserted physical key 242. Based on the identified shape of the inserted physical key 242, lock 218 generates a digital key 244. Based on configuration 222 determined in the Lock and Key Configuration 220 processes, lock 218 either verifies the inserted physical key based on received a digital key in configuration 222 or lock 218 provides verification 246 for the inserted physical key based on sending the digital key for the inserted physical key 242 to key manager 212 for verification. If the digital key 244 and digital key 234 match, then lock 218 of key manager has verified the inserted physical key 242, signaling that lock 218 should disengage.

Figure 3:
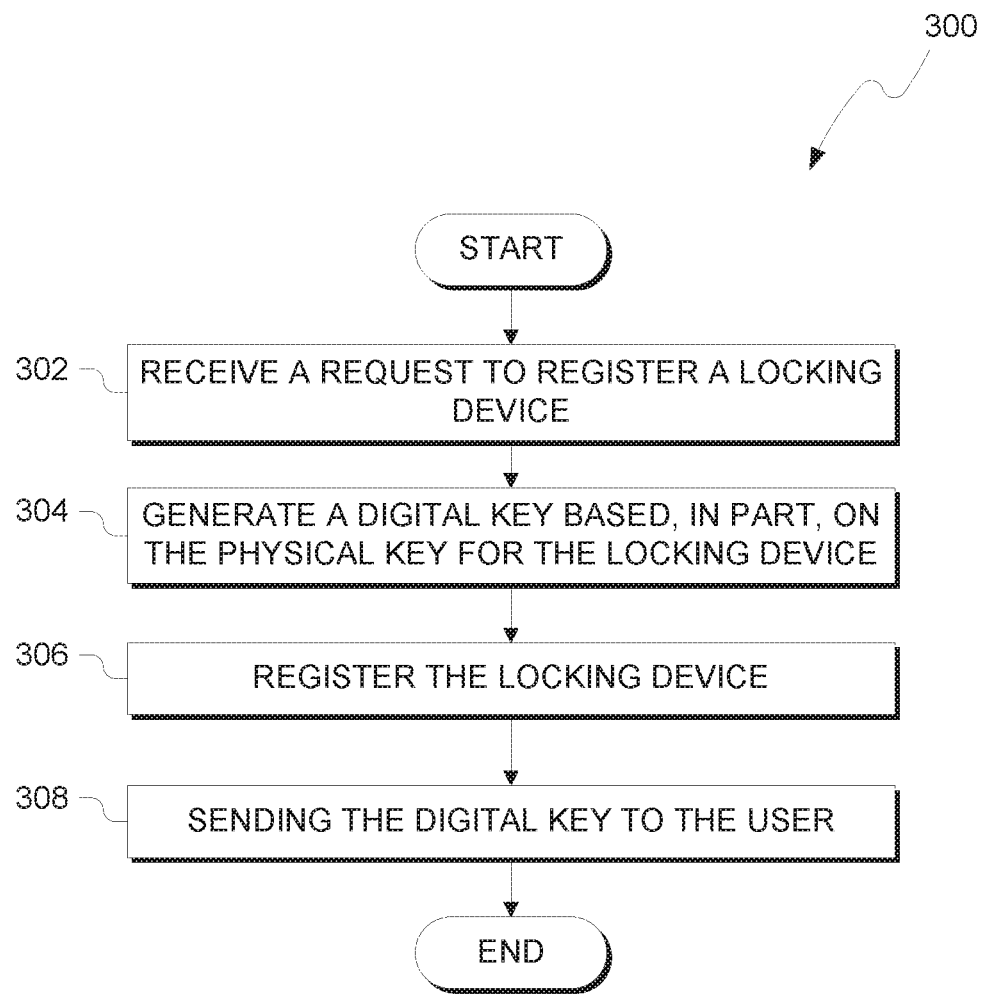
FIG. 3 illustrates operational processes of a key management program, on one or more computing devices within the environment of FIG. 1, in accordance with an exemplary embodiment of the present invention.

FIG. 3 illustrates operational processes, generally designated as 300, of key management program 112 during the registration and configuration of a lock from locking devices 130. In process 302, key management program 112 receives a request to register a lock from locking devices 130. In some scenarios, once a locking device 130 connects to network 140, the locking device 130 initiates registration. In other scenarios, a user or owner of locking device 130 initiates the registration process. In process 304, key management program 112 generates a digital key based in part on an encoding or mapping of a physical key structure. For example, based on the bitting of a desired physical key, key management program 112 generates a mapping of the key. In some scenarios, key management program 112 utilizes the mapping as a digital key in key data 119. In other scenarios, key management program 112 encrypts or provides additional encoding to the mapping prior to generating and storing the digital key in key data 119.

In process 306, key management program 112 registers the device. During registration, a configuration for the registered lock is also generated. In some scenarios, the registered lock is configured to provide offline or local verification. In such scenarios, key management program 112 sends the digital key generated in process 304 to the registered lock for local verification. In other scenarios, key management program 112 configures the registered lock to send subsequent verification requests to key management program 112. In process 308, key management program 112 sends the digital key to the user for creation of a physical key. One of ordinary skill in the art will appreciate that the digital key may be disseminated or shared to users at a later time. Additionally, key management program 112 may also include an account management system to authorize and track users' registrations of locks and dissemination of the digital key for a given lock. Furthermore, one of ordinary skill in the art will appreciate that the registration of a lock may be performed again to reset the access to the lock by re-configured and re-issuing a new digital key for the lock.

Figure 4:
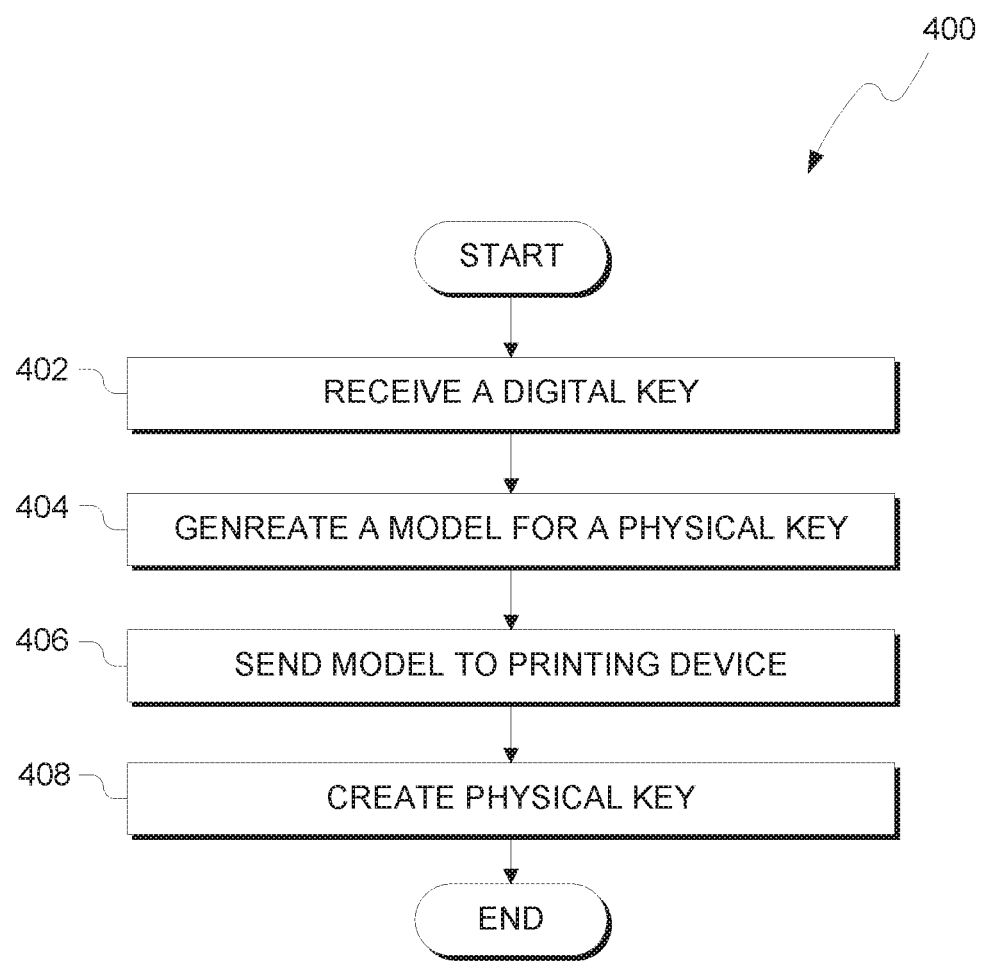
FIG. 4 illustrates operational processes of a 3D printing program, on one or more computing devices within the environment of FIG. 1, in accordance with an exemplary embodiment of the present invention.

FIG. 4 illustrates operational processes, generally designated as 400, of 3D printing program 122. In process 402, 3D printing program 122 receives a digital key. For example, a user inputs the digital key via a user interface and input device. As another example, a user provides a storage device or network location with a copy of the digital key to 3D printing program 122. In process 404, 3D printing program 122 generates a 3D model for a physical key to be printed by a printing device connected to 3D printing device 120. Based on the mapping scheme, and encryption is used, 3D printing program 122 decodes the digital key to generate model data to provide to a printing device connected to 3D printing device 120. In process 406, 3D printing program 122 sends the model to a printing device connected to 3D printing device 120. In response the printing device connected to 3D printing device 120 creates a physical key for the user (process 408).

Figure 5:
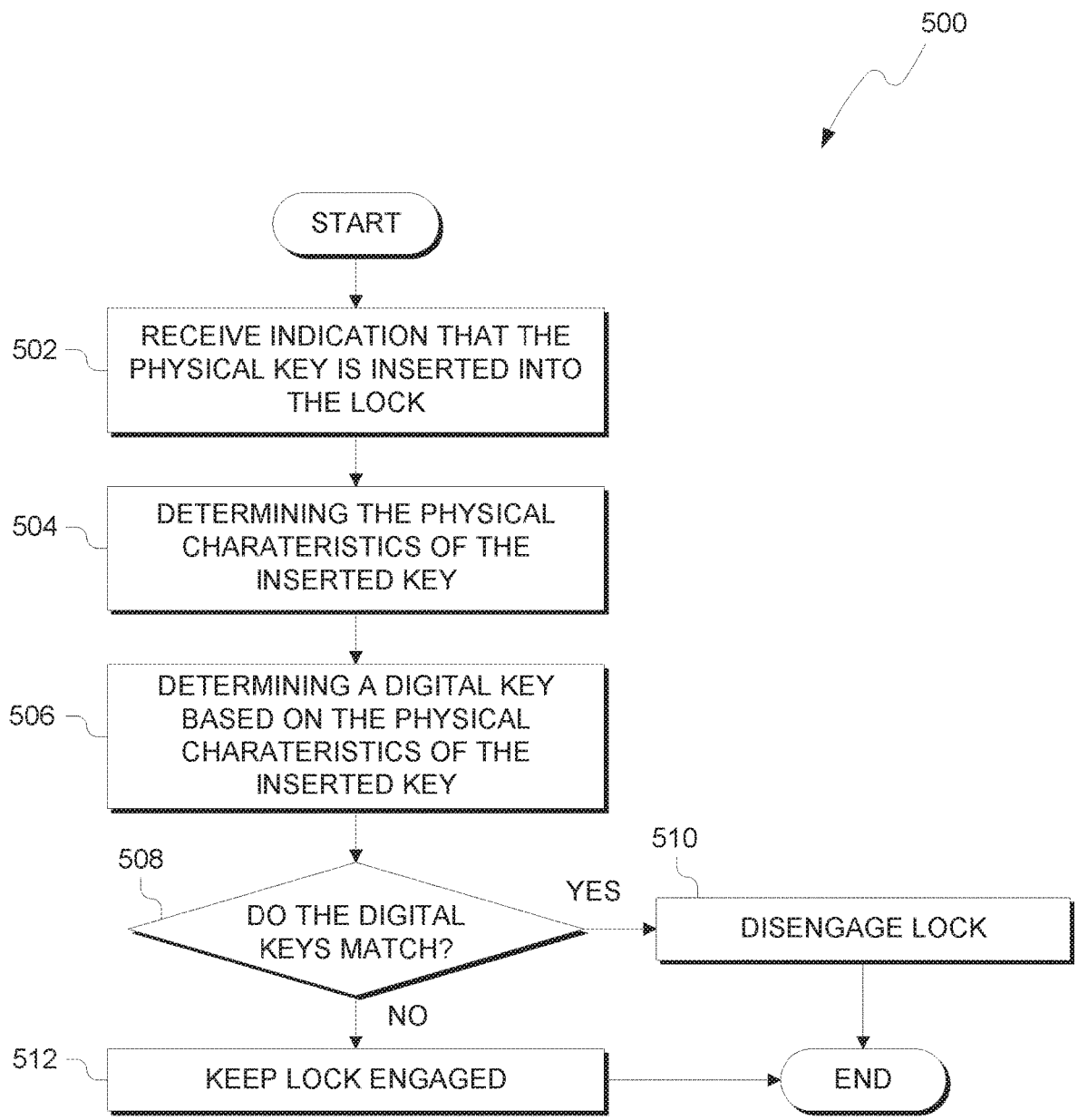
FIG. 5 illustrates operational processes of a security program, on one or more computing devices within the environment of FIG. 1, in accordance with an exemplary embodiment of the present invention.

FIG. 5 illustrates operational processes, generally designated as 500, of security program 132 for a registered lock. In process 502, security program 132 receives indication of a physical key being inserted into the lock. One or more sensors of locking device 130 identify that a physical key has been inserted, as well as the physical characteristics of the inserted key (process 504), such as size, shape and other bitting information of the inserted key. Based on the physical characteristics of the inserted key, security program 132 determines a digital key corresponding to the inserted physical key (process 508). In scenarios where only a bitting map is utilized in the registration and generation of key data 119, the same mapping process is performed by security program 132 to determine the digital key. In further scenarios where encryption or encoding is additionally used in conjunction with the bitting map, security program 132 encrypts or encodes the mapping using the same process during registration and generation of key data 119 for the lock.

In process 508, security program 132 determines if the digital keys match for both the inserted key determined in process 506 and the registered key data 119 value generated during registration (i.e., process 304 of FIG. 3). In some scenarios, security program 132 performs verification of matching digital key values locally. During registration of the lock, key management program 112 sends the registered key data 119 value generated during registration (i.e., process 304 of FIG. 3) to security program 132 for local storage and verification. In other scenarios, key management program 112 performs verification of matching digital key values remotely. In such scenarios, security program 132 sends the digital key for the inserted key determined in process 506 to key management program 112. In response, key management program 112 compares the received digital key to key data 119 to verify that the digital keys match.

In various embodiments, if the digital keys match for both the inserted key and the digital key generated during registration (YES branch of process 508), then security program 132 sends a signal or instruction to the connected lock to disengage (process 510), permitting the user access to the object or area locking device 130 is being used to control access to. Otherwise (NO Branch of process 508), locking device 130 remains engaged (process 512), limiting access to the object or area.

Figure 6:
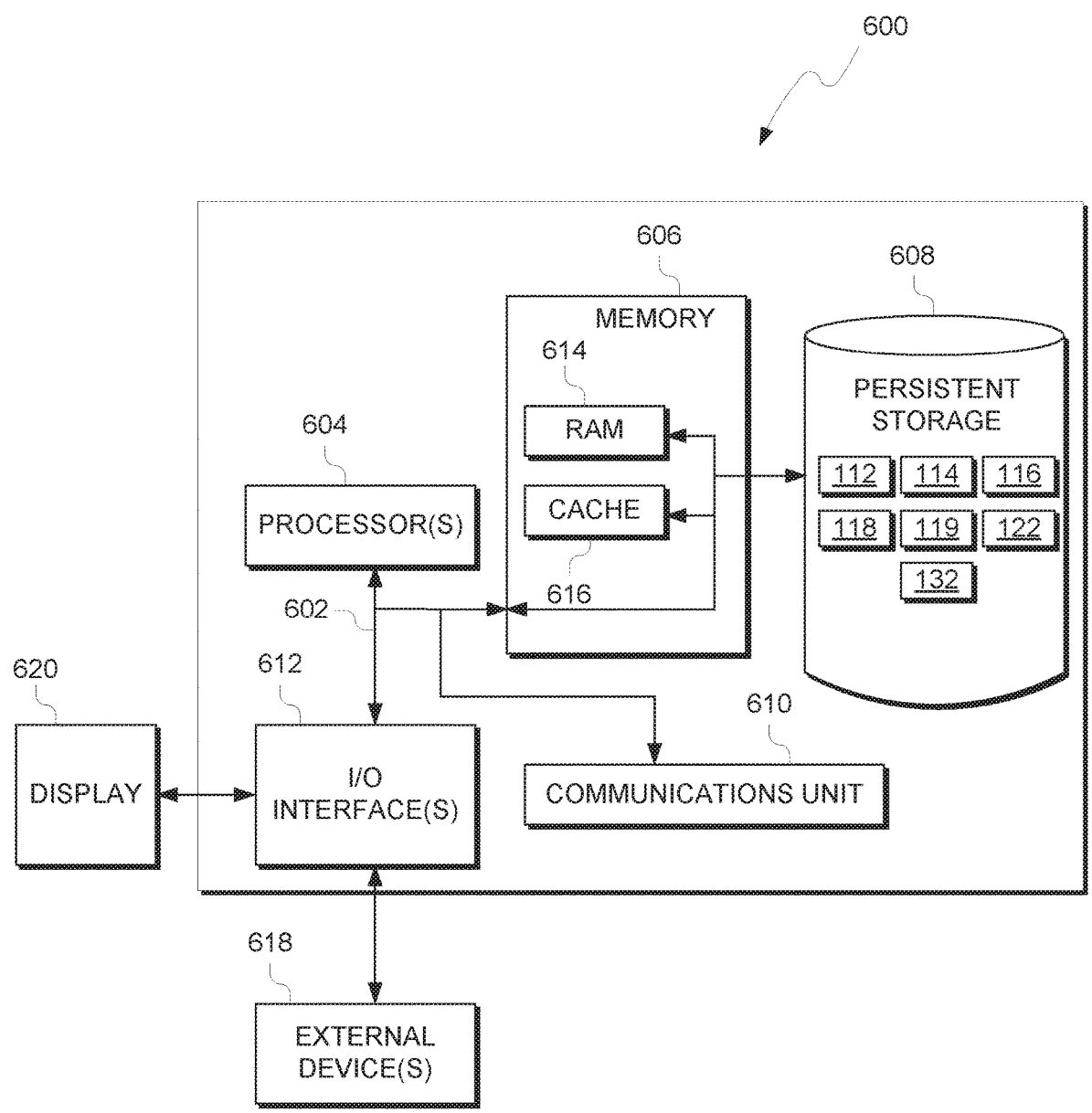
FIG. 6 depicts a block diagram of components of the computing devices executing a key management program, a 3D Printing program and a security program, in accordance with an exemplary embodiment of the present invention.

FIG. 6 depicts a block diagram, 600, of components of computing device 110, 3D printing device(s) 120 and locking device(s) 130, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110, 3D printing device(s) 120 and locking device(s) 130 each include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Key data 119, key management program 112, 3D printing program 122, and security program 132 are stored in device respective persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 140. In these examples, communications unit 610 includes one or more network interface cards. Communications unit 610 may provide communications through the use of either or both physical and wireless communications links. Key data 119, key management program 112, 3D printing program 122, and security program 132 may be downloaded to persistent storage 608 through communications unit 610.

I/O interface(s) 612 allows for input and output of data with other devices that may be connected to Computing device 110, 3D printing device(s) 120 or locking device(s) 130. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., key data 119, key management program 112, 3D printing program 122, and security program 132, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
    receiving, by one or more processors, a registration of a physical lock from a user;
    determining, by the one or more processors, a verification source based on a connection quality to a network connected with the physical lock, wherein (i) the connection quality is based on an intermittence of a connection between the physical lock and a network-connected server and (ii) the verification source is selected from the physical lock or the network-connected server;
    generating, by the one or more processors, a first digital key based on a physical key structure to be used with the physical lock;
    sending, by the one or more processors, the first digital key to a 3D printing device to print a copy of a physical key, wherein the 3D printing device generates a model of the physical key structure based on the first digital key;
    in response to the physical key being inserted into the physical lock, determining, by the one or more processors, a second digital key based on a physical key structure of the inserted physical key, wherein the second digital key is determined based on bitting of the inserted physical key;
    comparing, by the one or more processors, the second digital key to the first digital key; and
    in response to the second digital key for the inserted physical key matching the first digital key registered to the physical lock, verifying, by the one or more processors, the inserted physical key.

2. A computer program product comprising:
    one or more computer-readable storage media and program instructions stored on the one or more computer-readable storage media, the program instructions comprising:
    program instructions to receive a registration of a physical lock from a user;
    program instructions to determine a verification source based on a connection quality to a network connected with the physical lock, wherein (i) the connection quality is based on an intermittence of a connection between the physical lock and a network-connected server and (ii) the verification source is selected from the physical lock or the network-connected server;
    program instructions to generate a first digital key based on a physical key structure to be used with the physical lock;
    program instructions to send the first digital key to a 3D printing device to print a copy of a physical key, wherein the 3D printing device generates a model of the physical key structure based on the first digital key;
    in response to the physical key being inserted into the physical lock, program instructions to determine, a second digital key based on a physical key structure of the inserted physical key, wherein the second digital key is determined based on bitting of the inserted physical key;
    program instructions to compare the second digital key to the first digital key; and
    in response to the second digital key for the inserted physical key matching the first digital key registered to the physical lock, program instructions to verify the inserted physical key.

3. A computer system comprising:
    one or more computer processors;
    one or more computer readable storage media; and
    program instructions stored on the computer readable storage media for execution by at least one of the one or more processors, the program instructions comprising:
    program instructions to receive a registration of a physical lock from a user;
    program instructions to determine a verification source based on a connection quality to a network connected with the physical lock, wherein (i) the connection quality is based on an intermittence of a connection between the physical lock and a network-connected server and (ii) the verification source is selected from the physical lock or the network-connected server;
    program instructions to generate a first digital key based on a physical key structure to be used with the physical lock;
    program instructions to send the first digital key to a 3D printing device to print a copy of a physical key, wherein the 3D printing device generates a model of the physical key structure based on the first digital key;
    in response to the physical key being inserted into the physical lock, program instructions to determine, a second digital key based on a physical key structure of the inserted physical key, wherein the second digital key is determined based on bitting of the inserted physical key;

program instructions to compare the second digital key to the first digital key; and in response to the second digital key for the inserted physical key matching the first digital key registered to the physical lock, program instructions to verify the inserted physical key.

\* \* \* \* \*